Jan. 26, 1926.
V. BETÉS
GROUND CLEANING RAKE
Filed Nov. 19, 1924
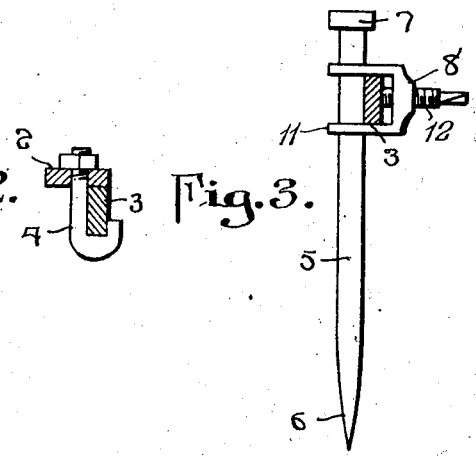
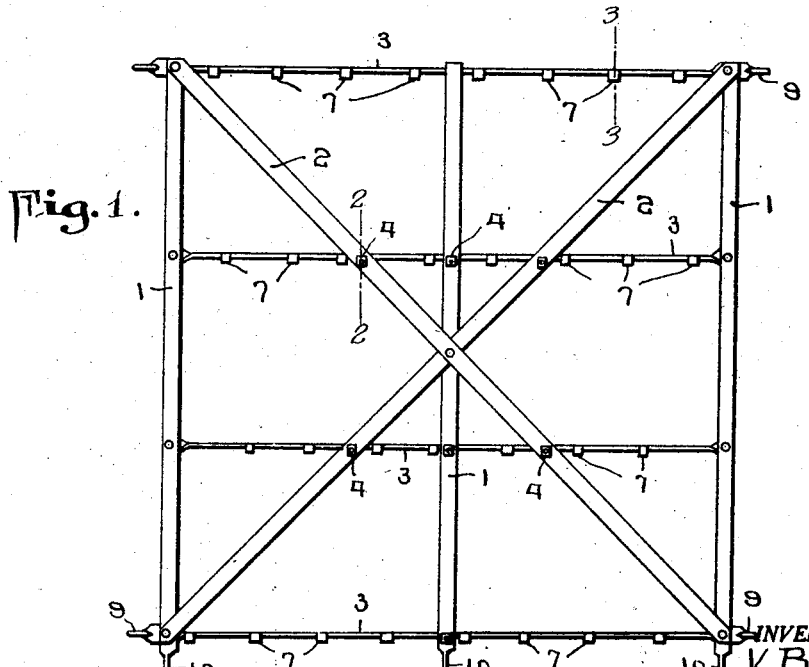

Patented Jan. 26, 1926.

1,570,820

UNITED STATES PATENT OFFICE.

VICENTE BETÉS, OF VENADO TUERTO, ARGENTINA.

GROUND-CLEANING RAKE.

Application filed November 19, 1924. Serial No. 750,935.

*To all whom it may concern:*

Be it known that I, VICENTE BETÉS, citizen of the Argentine Republic, residing at Venado Tuerto, Province of Santa Fe, Argentine Republic, have invented certain new and useful Improvements in Ground-Cleaning Rakes, of which the following is a specification.

This invention has reference generally to ground cleaning devices and more particularly relates to a ground cleaning rake.

The invention as its primary aim and object consists in the provision of a device of the above mentioned character designed to be drawn over the ground particularly during dry weather and the matter engaged thereby ignited so that as the device continues to advance plants, weeds and the like are uprooted, ignited and burned.

It is an additional and equal important object of the invention to improve the construction of the teeth and the means for mounting the same and to construct the parts entirely of material so as to ensure of the longevity thereof.

Other objects as well as the nature, characteristic features and scope of the invention will be more readily apparent from the following description taken in connection with the drawings and pointed out in the claim forming a part of the invention.

The invention is clearly illustrated in the accompanying drawings, in which:—

Fig. 1 is a top plan view of the improved rake,

Fig. 2 is an enlarged sectional detail partly in elevation showing the means for connecting the reinforcing bars to the transverse and vertically disposed teeth carrying bar, the view being taken on line 2—2 of Fig. 1, and Fig. 3 is an enlarged side elevational sectional detail of one of the rake teeth and means for attaching the same, the view being taken on line 3—3 of Fig. 1.

Referring now, more particularly, to the accompanying drawings there is provided a frame of longitudinally disposed bars 1 two of which are arranged so as to constitute sides of the frame while the remaining bar is arranged medially thereof and these bars 1 are connected together by cross bars 2, the cross bars being secured at their ends to the opposite ends of the end longitudinal bars 1 and at their point of intersection medially of the medial longitudinal bar 1. Arranged transversely of the frame are a plurality of vertically disposed bars 3 the ends being secured at suitable points to the end bars 1 preferably by suitable fasteners 4 which in the present instance consist of hook bolts which embrace the bar 3 so as to maintain them vertically with respect to the frame bars 1 and 2 the bolts being engaged by suitable nuts so that they may be detached when desired.

Arranged at uniform intervals throughout the length of the cross bars 3 are teeth 5 provided with sharpened points 6 and heads 7 and adjustably secured to the bars by means of staples 8. Each staple is of a substantially U-shaped configuration and includes an intermediate portion and spaced apertured arms 11, the apertured arms receiving the shanks of one of the teeth subsequent to the straddling of the staple about one of the vertically disposed cross bars 3. A set screw 12 is arranged through the intermediate portion of each staple and bears against the cross-bars so as to clamp the teeth in an adjustable position as shown in Fig. 3.

The frame at its sides near the forward and rear ends is provided with hooks 9 through which chains or straps are adapted to be engaged for connecting several of the frames together while clevises 10 are provided at the forward ends of the longitudinal bars and adapted to receive a draft device not shown through the medium of which the rake may be drawn over the ground.

In practice it has been found essential to construct all of the parts of metal and subsequent to a slight initial forward movement of the rake over the ground plants and weeds gathered therein are ignited so that on continued forward movement of the device the ground will be simultaneously raked and the plants and weeds burned.

It is believed in view of the foregoing a further detailed description of the invention is entirely unnecessary. Likewise it is believed that the advantages of the invention will be readily apparent.

Having now fully described the invention what is claimed as new and desire to be secured by Letters Patent is:—

In a rake for cleaning the ground including in combination a frame having vertically disposed cross-bars, of a plurality of headed teeth, means for adjustably clamping the teeth in various positions of vertical adjustment on the cross-bars, including a staple-shaped member embodying spaced apertured arms arranged in straddled engagement with the cross-bar and receiving one of the teeth through the apertured ends, and a screw passing through the medial portion of the staple member and bearing against the cross-bar for clamping the parts in position.

In testimony whereof I affix my signature.

VICENTE BETÉS.